(12) United States Patent
Strangfeld et al.

(10) Patent No.: US 11,221,313 B2
(45) Date of Patent: Jan. 11, 2022

(54) METHOD AND DEVICE FOR EXAMINING A SAMPLE

(71) Applicant: Bundesrepublik Deutschland, vertreten durch den Bundesminister für Wirtschaft und Energie, Berlin (DE)

(72) Inventors: Christoph Strangfeld, Berlin (DE); Stefan Maack, Berlin (DE)

(73) Assignee: Bundesrepublik Deutschland, vertreten durch den Bundesminister für Wirtschaft und Energie, Berlin (DE)

(*) Notice: Subject to any disclaimer, the term of this patent is extended or adjusted under 35 U.S.C. 154(b) by 27 days.

(21) Appl. No.: 16/343,049

(22) PCT Filed: Oct. 20, 2017

(86) PCT No.: PCT/EP2017/076908
§ 371 (c)(1),
(2) Date: Apr. 18, 2019

(87) PCT Pub. No.: WO2018/077759
PCT Pub. Date: May 3, 2018

(65) Prior Publication Data
US 2020/0049667 A1  Feb. 13, 2020

(30) Foreign Application Priority Data
Oct. 26, 2016 (DE) .................... 10 2016 120 454.4

(51) Int. Cl.
*G01N 29/24* (2006.01)
*G01N 29/07* (2006.01)
(Continued)

(52) U.S. Cl.
CPC ......... *G01N 29/2431* (2013.01); *G01N 29/07* (2013.01); *G01N 29/075* (2013.01);
(Continued)

(58) Field of Classification Search
CPC .. G01N 29/2431; G01N 29/07; G01N 29/075; G01N 29/11; G01N 29/343
See application file for complete search history.

(56) References Cited

U.S. PATENT DOCUMENTS 3,247,861 A  4/1966 Bauer
3,463,716 A  8/1969 Levavasseur
(Continued)

FOREIGN PATENT DOCUMENTS

DE  102007030270 B3  10/2008
EP  1742047 A1  1/2007
GB  1308649 A  2/1973

OTHER PUBLICATIONS

Hiroki et al., "Fluidic Oscillator Using a Supersonic Bistable Device and its Oscillation Frequency", The Journal of Fluid Control, vol. 21, Issue 4, pp. 28-47, Jan. 1993.
(Continued)

*Primary Examiner* — Helen C Kwok
(74) *Attorney, Agent, or Firm* — Bachman and LaPointe PC; George Coury

(57) ABSTRACT

A method for examining a sample (50) including the steps of exciting a propagating mechanical deformation (2) in the sample (50) using a fluidic oscillator (10), and determining a characteristic of the mechanical deformation (2).

21 Claims, 3 Drawing Sheets

(51) Int. Cl.
*G01N 29/11* (2006.01)
*G01N 29/34* (2006.01)

(52) U.S. Cl.
CPC .......... *G01N 29/11* (2013.01); *G01N 29/343* (2013.01); *G01N 29/348* (2013.01); *G01N 2291/0289* (2013.01); *G01N 2291/0428* (2013.01)

(56) References Cited

U.S. PATENT DOCUMENTS

| | | | | |
|---|---|---|---|---|
| 3,556,120 | A * | 1/1971 | Bauer | F15C 1/22 137/804 |
| 3,672,352 | A * | 6/1972 | Summers | A61B 5/0031 600/476 |
| 3,798,959 | A * | 3/1974 | Bowles | G01B 17/00 73/37.5 |
| 3,881,168 | A * | 4/1975 | Farr | G01V 1/42 367/48 |
| 3,902,367 | A | 9/1975 | Grant et al. | |
| 3,914,754 | A * | 10/1975 | Kirk | F15C 1/005 137/553 |
| 5,165,438 | A * | 11/1992 | Facteau | E21B 7/24 137/1 |
| 5,413,116 | A * | 5/1995 | Radke | A61B 5/1114 600/590 |
| 6,628,989 | B1 * | 9/2003 | Penner | A61B 5/0028 310/322 |
| 6,764,446 | B2 * | 7/2004 | Wolinsky | A61B 5/0028 600/300 |
| 7,191,011 | B2 * | 3/2007 | Cantlon | A61M 5/14276 607/60 |
| 7,198,603 | B2 * | 4/2007 | Penner | A61B 5/0031 600/486 |
| 7,930,031 | B2 * | 4/2011 | Penner | A61B 5/0031 607/33 |
| 8,271,093 | B2 * | 9/2012 | Von Arx | A61N 1/37252 607/60 |
| 8,798,761 | B2 * | 8/2014 | Doron | A61B 5/0031 607/60 |
| 2003/0127142 | A1 * | 7/2003 | Stouffer | F15C 1/22 137/803 |
| 2006/0131012 | A1 * | 6/2006 | Blauch | E21B 43/16 166/249 |
| 2010/0210922 | A1 * | 8/2010 | Clasbrummel | A61B 7/005 600/301 |
| 2010/0324852 | A1 * | 12/2010 | Wolf | G01D 15/00 702/104 |
| 2011/0122727 | A1 * | 5/2011 | Gleitman | G01V 1/46 367/81 |
| 2011/1022727 | | 5/2011 | Gleitman et al. | |
| 2013/0092626 | A1 * | 4/2013 | Zimmerman | B01F 3/04517 210/601 |
| 2018/0134994 | A1 * | 5/2018 | Steele | C11D 3/3953 |
| 2018/0161786 | A1 * | 6/2018 | Bobusch | B05B 1/08 |
| 2018/0250481 | A1 * | 9/2018 | Salamitou | A61B 5/0816 |
| 2018/0370617 | A1 * | 12/2018 | Raghu | B64C 21/04 |
| 2019/0001389 | A1 * | 1/2019 | Ryzer | B29C 51/46 |
| 2021/0072193 | A1 * | 3/2021 | Bobusch | F15C 1/22 |

OTHER PUBLICATIONS

International search report for patent application No. PCT/EP2017/076908 dated Jan. 30, 2018.
Canadian examination report for patent application No. 3,041,917 dated Feb. 21, 2021.

* cited by examiner

METHOD AND DEVICE FOR EXAMINING A SAMPLE

BACKGROUND OF THE INVENTION

The present invention relates to a method for examining a sample, and in particular to a non-destructive testing method using sound, and to a corresponding device.

The use of energetic acoustic pulses for detecting structures, processes and parameters is common both in research and in industry. These are used, in particular, in non-destructive testing and in medical technology, without being limited thereto. When a defined time-controlled signal, and in particular pulses or vibrations, impinges on an inner or outer phase boundary of a sample to be examined, which hereafter is also referred to as an examination object, such as a test specimen, energetic interactions occur. A portion of the impressed energy may be reflected and detected by a receiver. Based on the received signals, conclusions may be drawn as to the properties of the examination object.

It is favorable to introduce as much energy of the transmitter as possible into the object to be examined, and to minimize the losses from boundary conditions and/or surrounding effects.

A number of different technical methods already exist for the excitation of samples or test items by way of sound. For this purpose, transmitters have previously been used as transducers, which operate according to various basic physical principles. Examples include transducers comprising vibrating membranes, piezoelectric transducers and thermoacoustic transducers. However, the transducers operating based on these mechanisms of action are generally limited in terms of the transmission power thereof and/or are subject to heavy losses on phase boundaries. As a result, the energy of the signals coupled into the examination object is very low compared to the excitation energy, resulting in high technical complexity, in particular when it comes to recording the signals necessary for the evaluation. Moreover, these transducers have a limited service life, which is highly dependent on the intensity of use.

SUMMARY OF THE INVENTION

With respect to what was said above, the present invention proposes a method, a device, and a use all as disclosed herein.

According to one embodiment, a method for examining (testing) a sample includes exciting a propagating mechanical deformation in the sample by way of a fluidic oscillator, and determining a characteristic of the mechanical deformation.

Typically, the method is an acoustic testing method.

The mechanical deformation is typically an elastic deformation.

Fluidic oscillators can take on a variety of designs, see publications U.S. Pat. No. 3,902,367 A and U.S. Pat. No. 3,247,861 A in this regard, for example, but dispense with mechanically vibrating components, or even entirely with mechanically moving components, when it comes to sustaining an oscillation of a fluid flowing through the oscillator, which is to say a material or a substance that is not able to absorb shear stresses in a position of rest, in particular a gas or a fluid. As a result, fluidic oscillators are very robust, durable, easy to scale and easy to control.

The term "fluidic oscillator" as it is used in the present specification is intended to describe a device for generating an oscillation of a fluid, which comprises a main channel for the fluid and does not include any moving parts or components that are disposed in the main channel and/or that exert a force on the fluid, acting in a flow direction of the fluid when the fluid flows through the main channel. In particular, the term "fluidic oscillator" as it is used in the present specification is intended to encompass a device for generating a self-excited and self-sustained oscillation of a fluid, which does not require and/or comprise any moving parts, and in particular no mechanically vibrating parts or components, for sustaining the oscillation of the fluid.

Fluidic oscillators can be operated by way of a connected pressure reservoir for the fluid. Driven by pressure, the fluid flows from the pressure reservoir into a chamber of the fluidic oscillator. In one embodiment, the free jet of the fluid formed in the chamber initially rests on one side of the chamber due to the chamber geometry. Through one or more feedback channels, the pressure signal of the free jet can be fed-back to the location in front of the entry into the chamber. This causes the jet to be deflected and to then rest on the other side of the chamber. As a result, an oscillation is created, which is caused by a natural fluid mechanical instability (self-excited oscillation), but may also be externally influenced. Depending on the geometry of the chamber and/or an outlet nozzle for the free jet from of the chamber, a wide variety of oscillations can be generated, both in terms of space and time. In addition to the component size and the geometry, the frequency of the oscillations is dependent on the pressure ratio between the pressure of the inflowing pressure reservoir and the ambient pressure. In this way, the excitation frequency in the Hz range and/or in the kHz range, which is typically particularly suited for non-destructive (non-damaging) examination of samples such as test specimens, and the MHz range can be controlled very easily by varying the pressure ratios.

Fluidic oscillators can also be scaled very well in terms of the component size and maintain their characteristics in the process.

Exciting a sample by way of the fluidic oscillator allows a very robust and versatile measuring set-up.

Moreover, losses during excitation can be at least considerably reduced compared to the previously used transducers, since the excitation signals can be generated in the fluid and transmitted via the fluid to the sample, without any additional interface. This is particularly important in the case of air-coupled (ultra)sonic testing since the excitation signal can be attenuated by 35 dB, or even more, due to a variety of acoustic impedances at interfaces of air to solids (such as a piezo transducer).

If air or water, for example, is used as the fluid, which can also be defined as a shear stress free medium when at rest, the risk of damaging sensitive sample surfaces or sensitive samples through contact is also significantly reduced. This also enables a gentle examination of soft samples. Due to a continuous non-contact excitation of the signals, moreover the duration of the measurement compared to measurements where point contact occurs can be considerably reduced. In this way, the measured samples can continue to be used without damage and/or repeated measurements can be carried out, whereby the reliability of the data can be improved.

The term "sample" as it is used in the present specification is intended to encompass the terms 'test specimen' and 'test item'.

The term "ultrasound" as it is used in the present specification is intended to describe sound having frequencies above the range of audible frequencies for humans, which is to say sound having frequencies starting at approximately 16 kHz.

The excitation of the mechanical deformation typically comprises a generation of an excitation signal by way of the fluidic oscillator and an interaction of the excitation signal with the sample. For this purpose, an (self-excited) oscillating free jet can be generated in the fluidic oscillator and directed at the sample.

The fluid used in the fluidic oscillator, such as air or water, can leave the fluidic oscillator in the direction of the sample, for example via the outlet nozzle of the fluidic oscillator. This enables particularly efficient excitation.

Typically, the excitation signal includes multiple (longitudinal) pressure fluctuations, for example multiple separate pulses (pulsed excitation) or an excitation wave (continuous excitation in a time window).

Moreover, it is possible to generate an excitation signal that is particularly favorable for a particular measurement, for example a signal including pulses of a predefined pulse shape and/or a predefined ratio of pulse width to pulse spacing at a pulse spacing that is easily settable via the pressure ratios, for a used fluid by way of the geometry and/or extension of the used fluidic oscillator, in particular the chamber geometry, and/or the pressure ratios.

For this purpose, in particular the chamber geometry, the feedback channels and the geometry thereof and//or the outlet geometry of the fluidic oscillator can be adapted prior to the measurement to a desired pulse shape by way of simulations, and a fluidic oscillator produced accordingly based thereon can be selected for the measurement.

When the excitation signal impinges on the sample, energetic interaction takes places. As a result, an elastic wave, for example, or a sequence of elastic waves, in particular sound waves or acoustic pulses, are generated in the sample, which pass through the sample, may possibly be reflected internally, and exit again as a secondary signal.

The elastic wave or the secondary signal can be detected by one or more suitable detectors, which hereafter are also referred to as sensors.

The detected signal allows conclusions to be drawn about the structures, processes and/or parameters of the sample. In simple cases, such conclusions can be drawn directly from the detected signal or a characteristic of the mechanical deformation derivable therefrom.

Typically, however, one or more suitable signal processing processes are provided for this purpose, so as to calculate characteristics such as signal propagation times, signal speeds, mode conversions, signal attenuations and/or phase shifts based on model assumptions.

It may also be useful to carry out the evaluation in the frequency space, for example to determine mode conversions by way of an impact echo method.

Signal processing processes can, in particular, be provided when multiple detectors and/or multiple fluidic oscillators are used, when measurements are carried out for different positional relationships between the sample and the fluidic oscillator, for example when the sample is scanned, when measurements are carried out using excitation signals having different (carrier) frequencies (for example a frequency sweep is carried out) and/or when measurements are carried out using different pulse amplitudes in the excitation signal.

Moreover, it is also possible to utilize multiple fluidic oscillators for examining the sample.

From the characteristic or characteristics of the mechanical deformation, it is then possible to determine a material property of the sample, and ascertain or even localize a feature of the sample, a phase boundary in the sample, a material defect and/or a damage to the sample.

An image-based representation of the ascertained material property or properties of the sample may be provided, for example a false-color or grayscale representation, such as is frequently used in ultrasonic testing methods.

According to one embodiment, a device for examining a sample comprises a fluidic oscillator for generating an excitation signal for the sample, a detector for detecting an excitation of the sample which can be generated by the excitation signal, and an evaluation unit, which is typically designed as a control and evaluation unit and which can be coupled to the detector and is configured to obtain data, hereafter also referred to as a measurement signal, generated by the detector during the detection of the excitation.

The device can be an ultrasonic measuring device, and in particular an ultrasonic testing device for the non-destructive examination of a test specimen, such as a workpiece, but also an ultrasonic diagnostic device for examining a subject as the specimen or examination object.

The device can be a sonic testing device, and in particular an ultrasonic testing device. Accordingly, the fluidic oscillator can be part of a transducer head and/or a probe.

According to one embodiment, a transducer testing head and/or a sound probe comprises a fluidic oscillator. This may be an ultrasonic testing transducer head or an ultrasonic probe.

Typically, the control and evaluation unit is configured to determine a characteristic of the excitation and/or to carry out the methods described herein, using the data.

The detector may be a strain sensor, a vibration transducer (pick-up), a piezoelectric detector or an electrostatic detector, for example. The detector, however, can also be formed by a laser vibrometer and/or comprise a laser vibrometer.

Moreover, the device can comprise multiple, typically identical, detectors and/or multiple fluidic oscillators.

Typically, the fluidic oscillator comprises a chamber having an inlet and an outlet, which can be designed as a nozzle (outlet nozzle).

Moreover, the inlet is typically fluidically connected to a pressure reservoir for the fluid.

The chamber can comprise a main channel, which is arranged between the inlet and the outlet, and one or more feedback channels, which are fluidically coupled to the main channel.

The pressure reservoir can moreover be fluidically connected to a pressure pump, which is typically activatable by the control and evaluation unit.

A respective valve can be arranged between the pressure pump and the pressure reservoir and/or between the pressure reservoir and the inlet of the chamber. The valve is typically activatable by the control and evaluation unit.

Typically, the control and evaluation unit is configured to trigger the generation of the excitation signal, for example by way of the valve and/or the pressure pump.

Moreover, the fluidic oscillator can be fluidically connected to, or comprise, a pressure sensor for controlling the generated oscillation.

The pressure sensor is typically connected to the control and evaluation unit.

According to one embodiment, a fluidic oscillator is used during an examination of a sample to excite a mechanical deformation propagating in the sample, and in particular an elastic wave and/or a sound wave.

According to still another embodiment, a computer program product, and in particular a computer-readable data carrier, such as a magnetically, electrically or optically readable data carrier, includes program commands suitable for prompting a processor of a control and evaluation units, such as a computer, to carry out and/or to control the methods described herein.

The above-described embodiments can be arbitrarily combined with one another.

BRIEF DESCRIPTION OF THE DRAWINGS

Further advantageous embodiments, details, aspects and features of the present invention will be apparent from the dependent claims, the description and the accompanying drawings. In the drawings:

In the figures, identical parts are denoted by identical reference numerals.

DETAILED DESCRIPTION

Figure 1A:
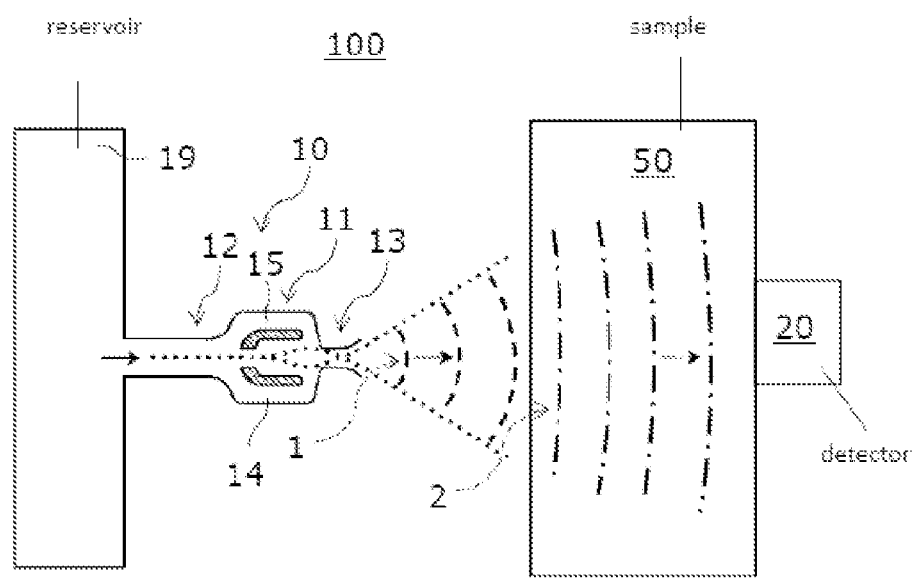
FIG. 1A shows a schematic representation of a device for examining a sample according to an embodiment.
Figure 1B:
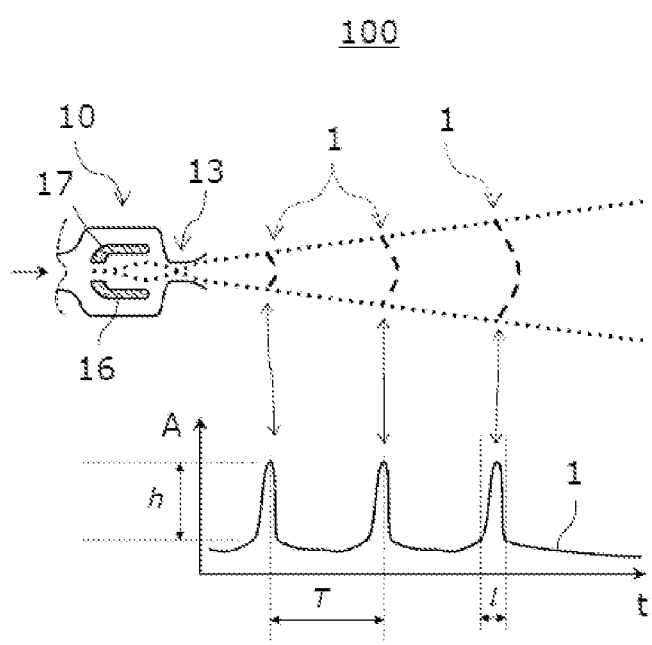
FIG. 1B shows a schematic representation of a detail of the device shown in FIG. 1A for examining a sample according to an embodiment.
Figure 2A:
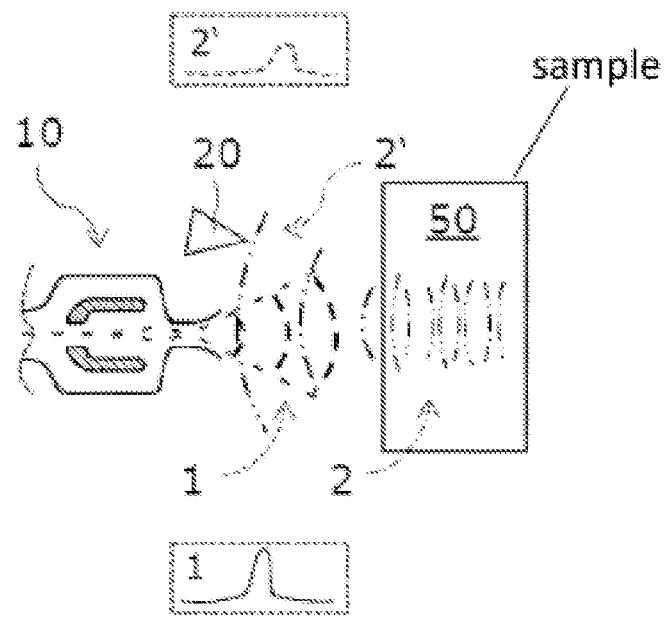
FIG. 2A shows a schematic representation of a device for examining a sample according to an embodiment.

FIG. 1A shows a schematic representation of a device 100 for examining a sample 50 or a solid test specimen. Since the device 100 is typically a testing device, it is also referred to hereafter as a testing device 100. FIG. 2A shows a central detail of the testing device 100. FIGS. 1A and 1B show the testing device 100 during the examination or testing of the sample 50.

The testing device 100 has a fluidic oscillator 10 for generating an excitation signal 1 with a fluid, such as air or water.

In the exemplary embodiment, the fluidic oscillator 10 is supplied with the fluid from a pressure reservoir 19. As the solid arrow indicates, the fluid flows from the pressure reservoir 19 into an inlet 12 of a chamber 11 of the fluidic oscillator 10 and forms a free jet represented by a dotted curve. No moving parts are disposed in the chamber 11 of the fluidic oscillator 10.

The free jet moves through a central main channel, which in a central chamber region is separated by two, typically mirror-symmetrically arranged, partitions 16, 17 from two feedback channels 15, 16. Upstream and downstream, however, the feedback channels 15, 16 are connected to the main channel. The main channel opens into an outlet nozzle 13 of the fluidic oscillator 10, through which the free jet can leave the fluidic oscillator 10.

As is shown by the branching of the dotted curve, the free jet oscillates in the fluidic oscillator 10 in a self-excited manner. Since the outlet nozzle 13 is directed at a surface, for example a front side of the sample 50, the sample 50 is subjected to an excitation signal 1 transported by the oscillating free jet.

In the exemplary embodiment, this causes the sample to be excited in the form of an elastic deformation or wave 2 of the sample 50, which can be detected by a detector 20.

As is shown in FIG. 1A, the fluidic oscillator 10 is typically disposed at a distance from the sample 50. For example, the device 100 can comprise respective holders (not shown) for the fluidic oscillator 10 and the sample 50. The holders can be disposed so as to be displaceable and/or orientable with respect to one another.

As is shown in FIG. 1A, the detector 20 can be disposed as a sound or strain detector on a rear side or on another surface of the sample 50. A coupling means can be disposed between the detector 20 and the surface of the sample 50.

If the detector 20 is disposed on the rear side, primary excitations 2 not reflected in the sample 50 can be detected particular well.

Depending on the sample 50, however, it is also possible to detect the excitation(s) 2 in a non-contact manner, for example by way of a laser vibrometer, an (air-coupled) microphone or an (air-coupled) piezo detector.

The bottom portion of FIG. 1b shows the amplitude A of a deflection or of acoustic pressure as a function of the time t of three acoustic pulses of an exemplary excitation signal 1, which can be generated by way of the fluidic oscillator 10. The shape of the pulses, but also the ratio of pulse width 1 to pulse spacing T are decisively determined by the size and geometry of the chamber 11 and of the outlet nozzle 13. The pulse spacing T and the pulse width 1 can be easily controlled by way of the pressure ratios and the component size. For a given fluid, the level of the pulses h depends both on the size and geometry of the fluidic oscillator and on the pressure ratios.

FIG. 2A shows a schematic representation of a central detail of a device 101 for examining a sample 50. The device 101 is similar to the device 100 described above with respect to FIGS. 1A and 1B.

However, in the exemplary embodiment shown in FIG. 2A, the detector 20 is disposed in front of the front side of the sample 50 to which the excitation signal 1 is applied. Accordingly, the detector 20 is able to detect, with sensitivity, in particular (secondary) signals of the excitations 2' reflected in the sample 50 and radiated by the front side.

Moreover, FIG. 2A in respective dotted boxes shows an exemplary excitation pulse of the excitation signal 1 and an associated phase-shifted pulse of the measurement signal 2'.

Figure 2B:
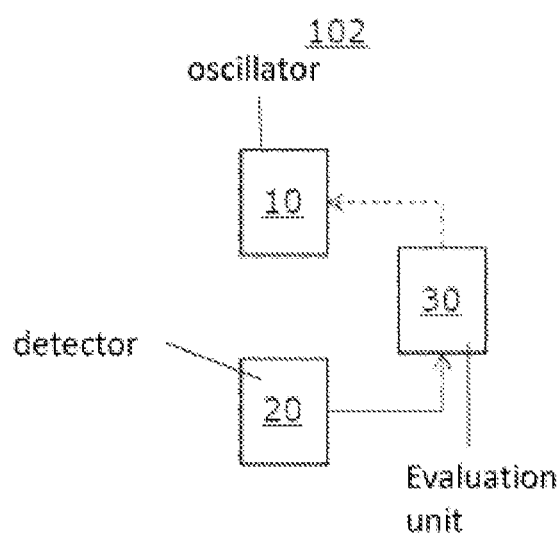
FIG. 2B shows a schematic representation of a device for examining a sample according to an embodiment.

As is apparent from FIG. 2B, which schematically shows a device 102 for examining samples similar to the devices 100, 101 described above with respect to FIGS. 1A to 2A, the measurement signals detected by the detector 20, which hereafter are also referred to as data, are typically transmitted to an evaluation unit 30.

The evaluation unit 30 is typically a control and evaluation unit 30, for example a computer provided with appropriate communication interfaces and software, or another electronic data processing system, which is able to trigger the generation of the excitation signal (1), for example by switching a valve, which is not shown, or a pump, which is not shown, for supplying a pressure reservoir for the fluidic oscillator 10.

Figure 2C:
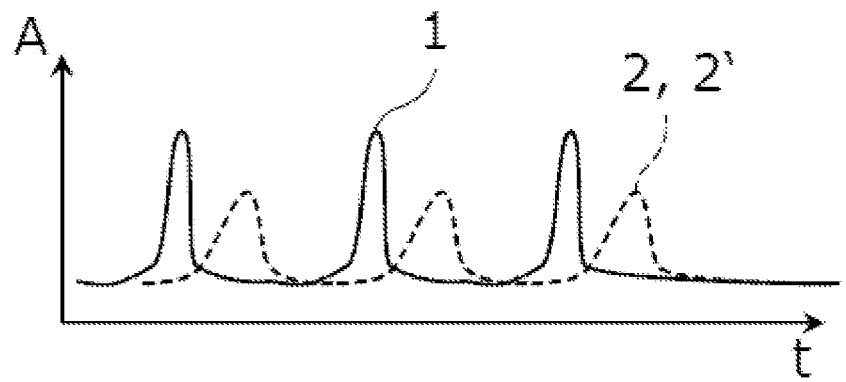
FIG. 2C shows typical signals that can be generated and measured using the devices shown in FIGS. 1A to 2B.

FIG. 2C shows three pulses of a typical excitation signal 1 and three pulses of a typical corresponding measurement signal 2, 2', each in the form of an amplitude A of a deflection or the acoustic pressure as a function of the time t, such as those which can be generated or measured by way of a device 100 to 102 shown in FIGS. 1A to 2B, and which can be used for determining a characteristic of the mechanical deformation of the sample excited by the excitation signal 1.

Figure 2D:
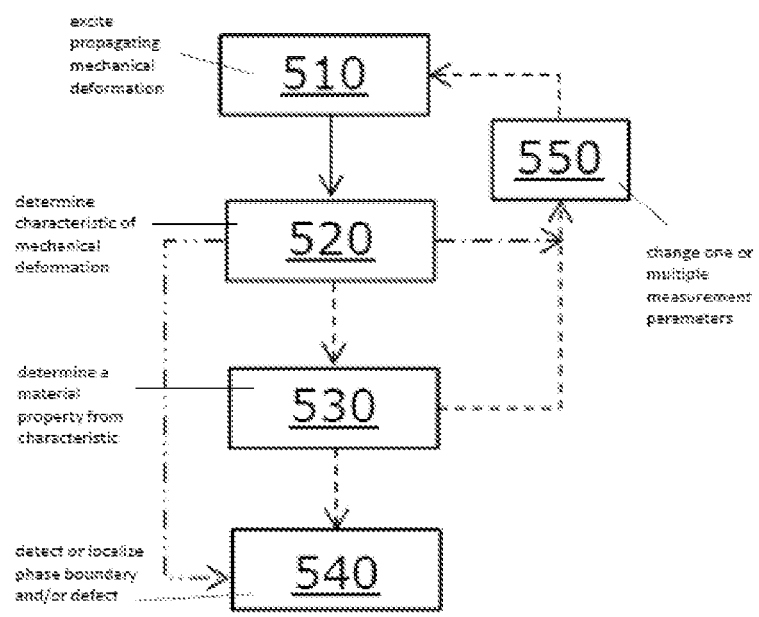
FIG. 2D shows steps of a method for examining a sample according to an embodiment.

FIG. 2D shows a block diagram of a method 500 for examining a sample. In a block 510, a propagating mechanical deformation in the sample is excited by way of a fluidic oscillator.

For this purpose, typically an excitation signal is generated by way of the fluidic oscillator and caused to interact with the sample.

In a block 520, the characteristic of the mechanical deformation can then be determined.

For this purpose, typically a measurement signal correlated with the mechanical excitation of the sample is detected by way of a detector.

Moreover, the measurement signal is typically transmitted to an evaluation unit and/or graphically represented.

The characteristic can be a run time, a propagation speed, a mode conversion, an attenuation, a phase shift in relation to the excitation signal or a variable derived from one or more of these variables.

In a block 530, the characteristic can then be used to determine a material property of the sample, for example a density or a modulus of elasticity.

As is indicated by the dash-dotted arrow in FIG. 2D, as an alternative or in addition another measurement cycle can be initiated with the blocks 510, 520, wherein in an optional block 550 initially one measurement parameter is changed or multiple measurement parameters are changed.

Measurement parameters can be, in particular, the positional relationship between the sample and the fluidic oscillator, the positional relationships between the sample and the detector, the frequency of the excitation signal, the pulse width and shape, and the amplitude(s) of the excitation signal (such as the amplitude(s) of the acoustic pulses of the excitation signal).

Moreover, one (or multiple) further measurement cycle (510, 520) having changed measurement parameter(s) can also be initiated subsequently to the block 530. For example, the further measurement cycle (510, 520) can be carried out with a changed positional relationship between the sample and the fluidic oscillator (in particular scanning of the sample).

In addition, the presence of a phase boundary and/or a defect (or several defects) in the sample, in particular a material defect or damage to the sample, can be detected or even localized in a block 540.

While typically multiple measurement cycles (510, 520) are used for localizing the defect, in many instances the presence of a defect can be inferred based on one measurement cycle (510, 520), for example when checking series-produced parts in quality control.

For example, the characteristic of the mechanical deformation determined in the block 520 can also be a deviation of the measurement signal from an expected measurement signal (of a standard part). In the block 540, the deviation can then be compared to a threshold value, for example.

Moreover, it is possible prior to the block 510 to calculate, produce, select a fluidic oscillator that appears to be particularly suitable for the measurement, which is to say a fluidic oscillator that is well-adapted to a desired pulse shape of the excitation signal, and/or to install the same in the set-up or the testing device.

According to one embodiment, a method for examining a sample includes generating an excitation signal by way of a fluidic oscillator, causing the excitation signal to interact with the sample so as to generate a mechanical excitation of the sample, and in particular an elastic excitation of the sample, and detecting a measurement signal correlated with the excitation of the sample by way of a detector.

According to one embodiment, a test method for the non-destructive examination of a sample, typically of a test specimen, comprises generating an excitation signal having a frequency that is in the kHz range or above (frequency range starting at 1 kHz) by way of a fluidic oscillator, and causing the excitation signal to interact with the sample, typically with a surface of the sample, so as to excite a mechanical deformation propagating in the sample, and determining a characteristic of the mechanical deformation propagating in the sample.

According to one embodiment, a sound measuring device, and in particular an ultrasonic measuring device, comprises a fluidic oscillator for generating an excitation signal for an examination object, and a detector for detecting an excitation of the examination object that can be generated by the excitation signal.

The sound measuring device can be ultrasonic diagnostic device or an ultrasonic testing device.

Typically, the sound measuring device furthermore comprises an evaluation unit, which can be coupled to the detector and is configured to obtain data generated by the detector during the detection of the excitation.

According to one embodiment, a fluidic oscillator is used to excite a mechanical deformation propagating in a sample, typically a test specimen, in the kHz range, in the MHz range or above (frequency range starting at 1 kHz), typically a sound wave in the kHz range or MHz range, and still more typically an ultrasonic wave, during a non-destructive examination of the sample. For this purpose, the fluidic oscillator typically generates a free jet that transports an excitation signal in the kHz range and/or MHz range, and typically transfers this to the sample.

The present invention was described based on exemplary embodiments. These exemplary embodiments shall not be understood to be limiting to the present invention in any way. The following claims represent a first, non-binding attempt to define the invention in general terms.

The invention claimed is:

1. A method for examining a sample, the method comprising:
    generating an excitation signal transported by a free jet originating from a fluidic oscillator, the excitation signal comprising a frequency of at least 16 kHz;
    exciting a propagating mechanical deformation in the sample using the excitation signal;
    determining a characteristic of the mechanical deformation; and
    detecting, from the characteristic, at least one of a material property of the sample, a phase boundary in the sample, and a material defect in the sample, whereby the sample is non-destructively examined or non-destructively tested.

2. The method according to claim 1, wherein the exciting of the mechanical deformation comprises:
    generating an excitation signal using the fluidic oscillator; and
    causing the excitation signal to interact with the sample.

3. The method according to claim 1, further comprising:
    designing and/or selecting a fluidic oscillator having a geometry and/or an extension so that the fluidic oscillator generates an excitation signal having a predefined pulse shape for a given fluid.

4. The method according to claim 1, wherein the determining of the characteristics comprises detecting a measurement signal correlated with mechanical excitation of the sample using a detector, measuring the mechanical deformation, and/or measuring a secondary signal emitted by the sample using a detector.

5. The method according to claim 1, wherein the exciting of the mechanical deformation comprises generating an excitation signal using the fluidic oscillator, and causing the excitation signal to interact with the sample wherein the excitation signal is an acoustic signal, wherein the excitation signal comprises a plurality of pulses having predefined and/or settable pulse spacing, wherein the mechanical deformation comprises an acoustic wave, and/or wherein a secondary signal is emitted by the sample using a detector and is an acoustic signal.

6. The method according to claim 2, wherein the characteristic is a run time, a propagation speed, a mode conversion, an attenuation, a phase shift in relation to the excitation signal or a variable derived from one or more of the run time, the propagation speed, the mode conversion, the attenuation and the phase shift.

7. The method according to claim 1, wherein the method is an ultrasonic testing method.

8. The method according to claim 1, wherein the propagating mechanical deformation is at least one of an elastic wave and an acoustic wave, and wherein the propagating mechanical deformation comprises a frequency of at least 16 kHz.

9. The method according to claim 2, wherein the excitation signal interacts with a surface of the sample.

10. A device for examining a sample, comprising:
    a fluidic oscillator for generating an excitation signal for the sample, wherein the fluidic oscillator is configured to generate the excitation signal in such a way that the excitation signal comprises a frequency of at least 16 kHz and is transported by a free jet;
    a detector for detecting an excitation of the sample generated by the excitation signal; and
    an evaluation unit coupled to the detector and configured to obtain data generated by the detector during the detection of the excitation, whereby at least one of a material property of the sample, a phase boundary in the sample, and a material defect in the sample are non-destructively detected from the data.

11. The device according to claim 10, wherein the device is an ultrasonic testing device.

12. The device according to claim 10, wherein the evaluation unit is a control and evaluation unit, which is configured to trigger the generation of the excitation signal.

13. The device according to claim 12, wherein the control and evaluation unit is configured to determine a characteristic of the excitation using the data.

14. The device according to claim 12, wherein the control and evaluation unit is configured to carry out the following steps:
    exciting a propagating mechanical deformation in the sample using the excitation signal transported by the free jet originating from the fluidic oscillator; and
    determining a characteristic of the mechanical deformation.

15. The device according to claim 10, wherein the excitation signal comprises a plurality of pulses having predefinable and/or settable pulse spacing, and wherein the excitation signal is an acoustic signal.

16. The device according to claim 10, wherein the device is a testing device for non-destructive examination of the sample.

17. A method for non-destructively examining a sample, comprising exciting a mechanical deformation propagating in the sample using a fluidic oscillator, wherein the mechanical deformation is a sound wave, and wherein the mechanical deformation propagating in the sample comprises a frequency of at least 16 kHz; determining a characteristic of the mechanical deformation; and detecting, from the characteristic, at least one of a material property of the sample, a phase boundary in the sample, and a material defect in the sample.

18. The method according to claim 1, further comprising: setting and/or varying a positional relationship between the sample and the fluidic oscillator.

19. The method according to claim 1, further comprising: setting and/or varying a frequency of the excitation signal.

20. The method according to claim 1, further comprising: setting and/or varying an amplitude of the excitation signal.

21. The method of claim 1, wherein the step of generating the excitation signal comprises generating the free jet by connecting the fluidic oscillator with a pressure reservoir of non-heated fluid.

* * * * *